Dec. 1, 1925.

A. H. FOX 1,563,478

MEANS FOR AIR COOLING ENGINES

Filed July 1, 1922

3 Sheets-Sheet 2

INVENTOR
Ansley H. Fox
BY
Butler & Denny
ATTORNEY

Patented Dec. 1, 1925.

1,563,478

UNITED STATES PATENT OFFICE.

ANSLEY H. FOX, OF PHILADELPHIA, PENNSYLVANIA, ASSIGNOR TO FOX HOLDING COMPANY, OF PHILADELPHIA, PENNSYLVANIA, A CORPORATION OF DELAWARE.

MEANS FOR AIR-COOLING ENGINES.

Application filed July 1, 1922. Serial No. 572,319.

*To all whom it may concern:*

Be it known that I, ANSLEY H. FOX, a citizen of the United States, residing in the city of Philadelphia, county of Philadelphia, and State of Pennsylvania, have invented certain Improved Means for Air-Cooling Engines, of which the following is a specification.

My invention relates to improved means for air cooling engines, particularly internal combustion engines used in motor vehicles, whereby greater cooling is effected with less expenditure of power than heretofore accomplished in air cooling.

Results of my improvements are that they make practicable the use of air cooled engines of higher power operating at higher speeds and the reduction of the power required for producing a given air cooling effect.

In my invention, the engine to be cooled is provided with means for carrying over its heated surface the maximum volume of air with the minimum expenditure of force, so that substantially unobstructed currents of air moving at high speed sweep over the heated surfaces of the engine and, by the rapid absorption of heat, prevent overheating.

In the preferred form of my improvements, they are applied to an engine provided with an overhead cam shaft for operating the valves and when thus applied they comprise an enclosing case for the shaft and its connections in combination with a case enclosing the sides of the cam shaft case together with the cylinder heads and their connections, so as to provide appropriate conduits for the air to the cylinders and the latter with jacketing means through which the air is forced at high velocity.

A characteristic feature of my invention is the use of a distributor which splits the air current on its way to the engine and directs its divisions without substantial obstructions, in proper proportions, to opposite sides of the engine, through the main case and the depending cylinder jacketing means.

Figure 1:
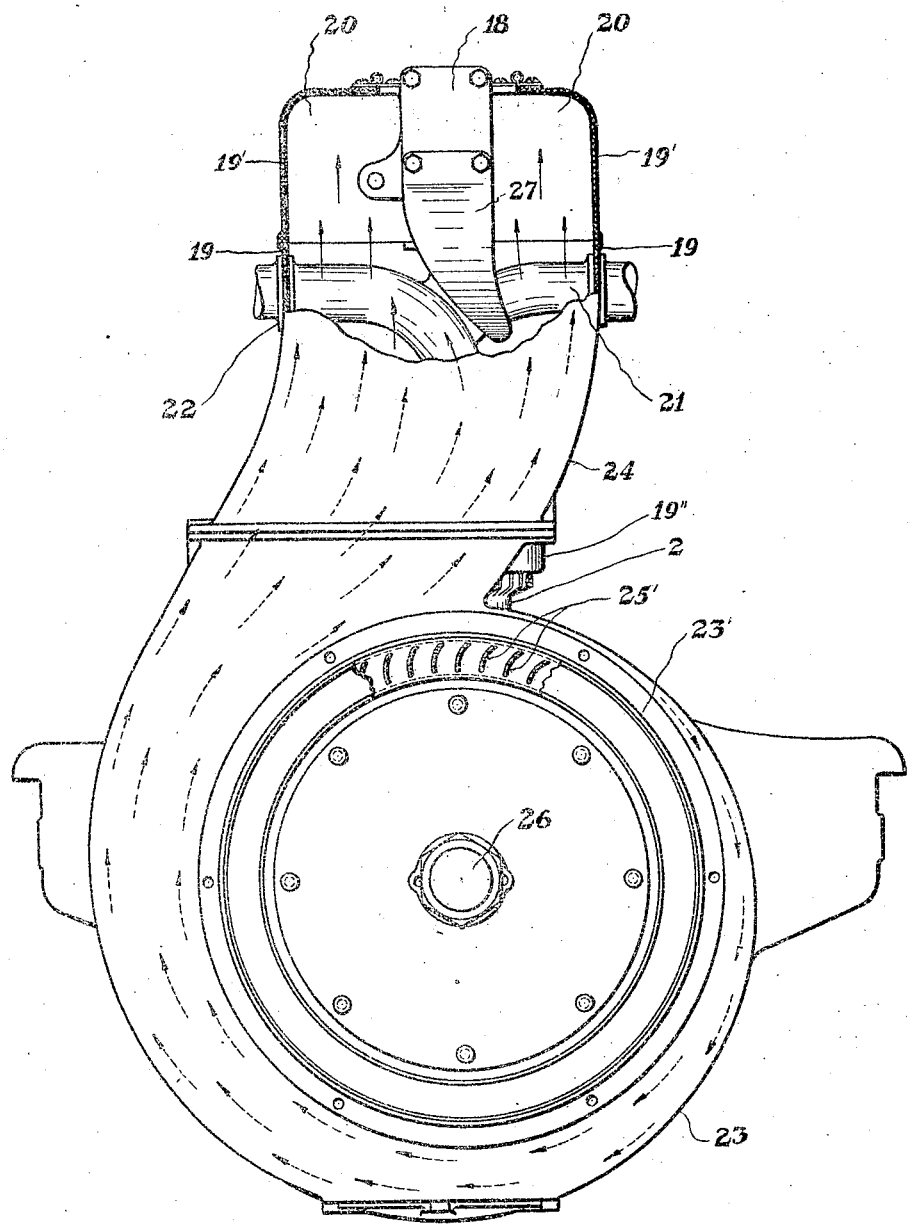
Figure 2:
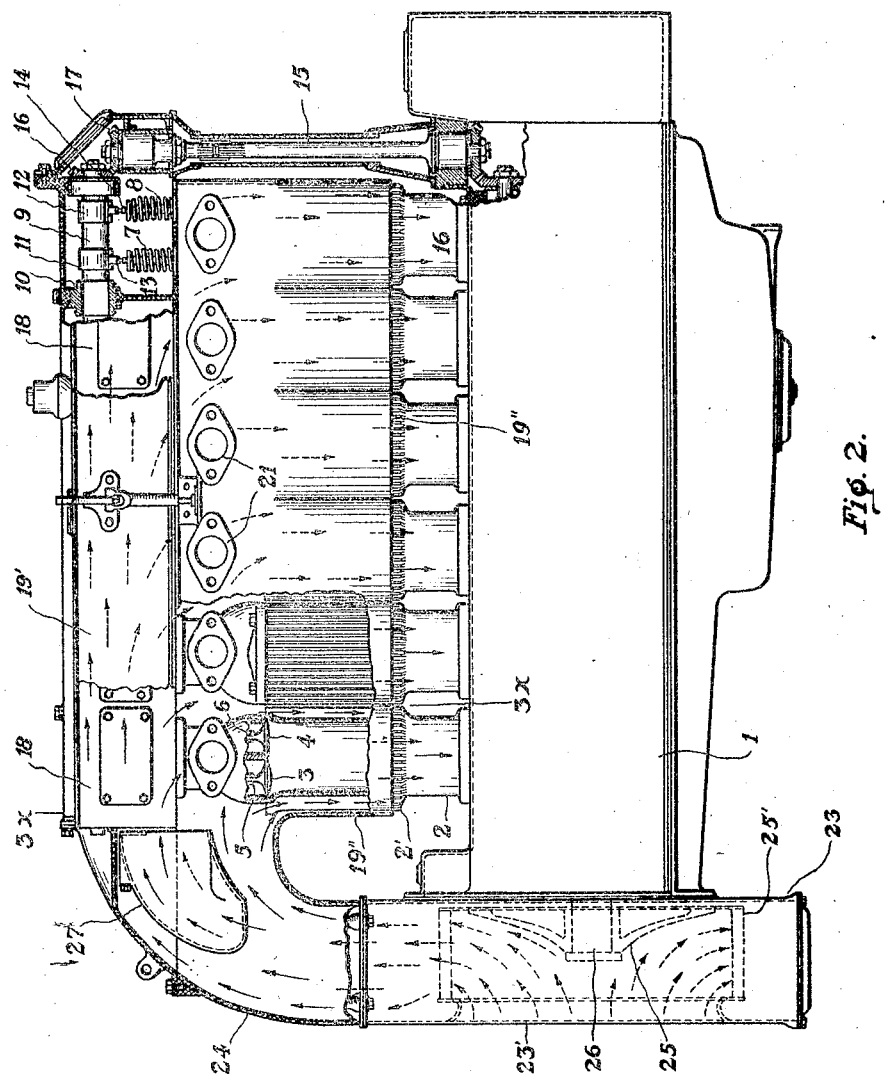
Figure 3:
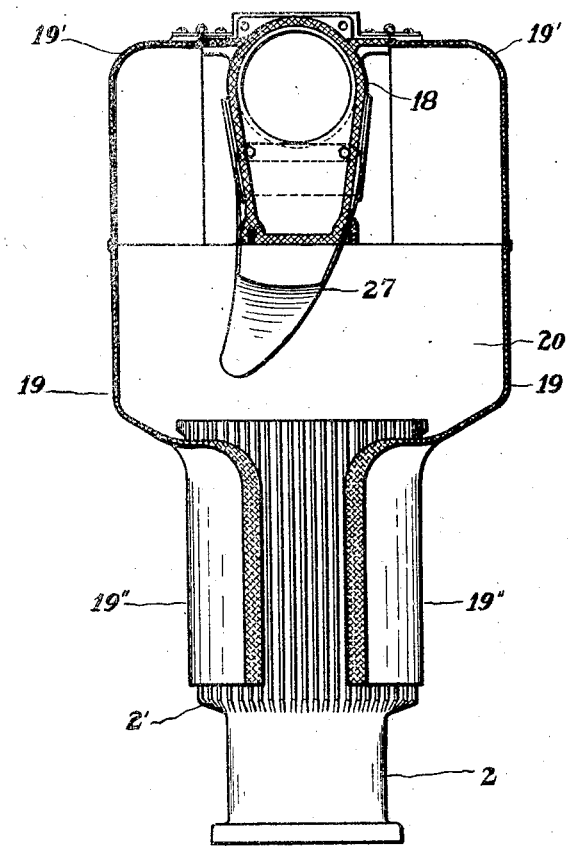

In the accompanying drawings, Fig. 1 is a broken front elevation of a scroll or spiral case containing a fan or blower for delivering an air blast to an engine through a conduit equipped with a form of my device for dividing the air; Fig. 2 is a part sectional side elevation of an engine equipped with my improved cooling system; and Fig. 3 is a sectional view taken on the line 3×—3× of Fig. 2.

The construction shown in the drawings, by way of illustrating a preferred application of my invention, comprises an engine having a crank case 1 on which are mounted cylinders 2 provided with valves 3 and 4, these valves having the respective valve stems 5 and 6 and springs 7 and 8. A shaft 9, journalled in bearings 10, is provided with cams 11 and 12 for operating the arms 13 and 14 to depress the respective stems 5 and 6 against the actions of the respective spring 7 and 8, the shaft 9 being revolved by a shaft 15 through the beveled gears 16 and 17 on the respective shafts.

This mechanism is illustrated and described as a form of engine to which my improved air cooling system has been applied.

In accordance with my improvements, the case 18 encloses the shaft 9 and its connections. A case 19 (provided with the doors 19′) forms a chamber 20 containing the sides of or divided longitudinally by the case 18, and is provided with the contracted depending part 19″ which lies close to and forms an air jacket for the cylinders 2 with the exterior fins 2′ thereon. The fuel gas passages 21 and the exhaust gas passages 22 of the engine pass through the side walls of the case 19 and the sides of the chamber 20 below the case 18.

A scroll or spiral case 23, fixed to the front of the crank case 1, is connected at its top by an elbow or bent conduit section 24 with the front end of the chamber 20. A fan 25, provided with the peripheral vanes 25′, is fixed on and revolved by the crank shaft 26, in the scroll case, through which such fan forces air from the scroll case inlet 23′, to the conduit section 24 and thence to the chamber 20, whence it flows downwardly within the jacket 19″ in contact with the surfaces of the cylinders.

An air spreader and distributor 27 is fixed at the forward end of the chamber 20 (as by bolting it to the forward end of the case 18) in the path of the air blast from the blower or fan 25. This wedge like device 27, projecting forwardly, downwardly and laterally in the passage through the conduit section 24, will split the blast by an acute angle, with the least practicable resistance, and direct the correct proportions of air to the parts of the chamber 20 with the cylinder heads therein, whence the air flows downwardly along the cylinders. The form and position of the air distributing means are such as to send the desired proportions of the air to the opposite sides of the engine for correct cooling, the side from which the exhaust passages extend to receive the most air.

In this air cooling system, it has been found that the use of the distributor in the path of the air blast, dividing it by an acute angle, so that such air is properly distributed to the cylinder heads and the cylinders at high velocity without substantial obstruction or the formation of counter currents, increases the velocity of the air flowing over the cylinders more than four fold in comparison with the best known prior construction, when running at a speed of 30 miles per hour.

While I have shown my air distributing means with a particular arrangement of passages for carrying the air over the engine, it will be understood that such arrangement is by way of describing a preferred application of my invention and not by way of limitation, excepting as required by the terms of the claims.

Having described my invention, I claim:

1. The combination with an internal combustion engine having one or more cylinders, of an air cooling system comprising a conduit leading to said engine, means in the course through said conduit to said engine for dividing and maintaining a division of the air flowing therethrough and deflecting the divided streams over the top and then downward over opposite sides of said cylinder or cylinders, and means for passing said streams at high velocity over said cylinder or cylinders in contact therewith.

2. The combination with an internal combustion engine having one or more cylinders and a crank case, of an air cooling system comprising a conduit leading to said engine, a device tapering to a plurality of angularly disposed edges in the course through said conduit to said engine for dividing air flowing therethrough, and means for carrying the divided streams of air on opposite sides of said engine through contracted passages in contact with said cylinder or cylinders above said crank case.

3. The combination with an internal combustion engine having cylinders provided with valves and overhead mechanism comprising a cam shaft for operating said valves, of a casing forming a chamber containing the heads of said cylinders, a casing in said chamber for said shaft, a conduit for delivering air to said chamber, and a device for splitting the air flowing through said conduit and directing separated streams to said chamber on opposite sides of said casing second named.

4. The combination with an internal combustion engine having cylinders, of air jacketing means for said cylinders, means comprising a blower and a conduit for passing air through said jacketing means in contact with said cylinders, and means for dividing the air flowing through said conduit by an acute angle into unequal streams and delivering the same to said jacketing means on opposite sides of said engine.

5. The combination with an internal combustion engine having one or more cylinders provided with air jacketing means, of a fan case, a fan acting in said case, means comprising an elbow for carrying air from said case to said jacketing means, and a device extending from said engine forwardly, laterally and downwardly in said elbow so as to divide the air flowing therethrough to said engine.

6. The combination with an internal combustion engine, having an overhead cam shaft casing, of means comprising a fan for forcing air over heated surfaces of said engine and a wedge shaped device disposed at the forward end of said cam shaft casing and between said fan and surfaces for dividing the air flowing to said surfaces without prior resistance from said engine.

7. The combination with an internal combustion engine comprising a plurality of cylinders, of a casing providing a chamber above said cylinders and extending downwardly to discharge ports below the tops of said cylinders, means forming a partition dividing the top of said chamber longitudinally into a plurality of compartments, a conduit discharging to said compartments of said chamber, a tapered device adjacent to said partitioning means for deflecting air flowing through said conduit without substantial obstruction thereof, and a blower for forcing air through said conduit.

8. The combination with an internal combustion engine having an intake manifold on one side thereof and an exhaust manifold on the other side thereof, of air jacketing means for said engine, a blower for forcing air through said jacketing means, and means comprising an air splitter for diverting a larger volume of air to the exhaust side of said engine than to the intake side thereof.

Signed at Philadelphia, in the county of Philadelphia and State of Pennsylvania, this 30th day of June, 1922.

ANSLEY H. FOX.